(12) United States Patent
Yamazaki

(10) Patent No.: US 6,246,596 B1
(45) Date of Patent: *Jun. 12, 2001

(54) SWITCHING POWER SUPPLY

(75) Inventor: Hiroshi Yamazaki, Nagano (JP)

(73) Assignee: Nagano Japan Radio Co., Ltd., Nagano (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/571,889

(22) Filed: May 16, 2000

(30) Foreign Application Priority Data

Sep. 30, 1999 (JP) .................................................. 11-279024

(51) Int. Cl.$^7$ .................................................. H02M 3/335
(52) U.S. Cl. .............................. 363/49; 363/56; 323/901; 323/908
(58) Field of Search ................................ 363/16, 20, 21, 363/49, 50, 56, 97; 323/901, 225, 908

(56) References Cited

U.S. PATENT DOCUMENTS

| 4,370,701 | * | 1/1983 | Western | ................................. | 363/20 |
| 4,866,590 | * | 9/1989 | Odaka et al. | .......................... | 363/49 |
| 5,477,175 | * | 12/1995 | Tisinger et al. | ..................... | 363/49 X |

FOREIGN PATENT DOCUMENTS 8-172773    7/1996   (JP) .

OTHER PUBLICATIONS

English Language Abstract of JP 8–172773 Jul. 2, 1996.

* cited by examiner

*Primary Examiner*—Jessica Han
(74) *Attorney, Agent, or Firm*—Greenblum & Bernstein, P.L.C.

(57) ABSTRACT

A switching power supply includes a power factor improvement converter circuit, a main switching circuit for generating output voltage from a DC voltage generated by the power factor improvement converter circuit, two control ICs for controlling the dual converter circuits, respectively, two capacitors for supplying current to the two control ICs, respectively, and at least one start-up circuit for controlling start-up of the two control ICs. The switching power supply includes an auxiliary power supply circuit for charging one of the capacitors with the DC voltage generated by the power factor improvement converter circuit, and the at least one start-up circuit is a single start-up circuit which includes one charging device formed by current-limiting resistors for charging the other capacitor, a Zener diode and a diode forming a unidirectional element via which energy stored in the one capacitor is supplied to the other capacitor when a charging voltage of the one capacitor is higher than a charging voltage of the other capacitor by a voltage equal to or higher than a predetermined voltage, and another charging device formed by a current-limiting resistor and a switching element for charging the one capacitor with the DC voltage generated by the power factor improvement converter circuit.

4 Claims, 3 Drawing Sheets

SWITCHING POWER SUPPLY

BACKGROUND OF THE INVENTION

1. Field of the Invention

This invention relates to a so-called dual-converter switching power supply having e.g. a power factor improvement circuit and a main switching circuit therein, and more particularly to a switching power supply including a start-up circuit for controlling start-up of two control circuits that control switching operation of the dual converter circuits, respectively.

2. Description of the Related Art

As a dual-converter switching power supply of this kind, there has been conventionally used a power supply 60 shown in FIG. 3 which is a schematic block diagram providing a conceptual representation of the power supply 60. The power supply 60 is comprised of a diode stack 61 for full-wave rectification of an AC current output from an AC power source 2, a power factor improvement converter circuit 62 for boosting a pulsating voltage (voltage of a pulsating current) VD generated by the diode stack 61 and thereby generating a DC voltage $V_{DC}$, and a main switching circuit 64 for switching the DC voltage $V_{DC}$ via a primary winding 63a of a transformer 63. Further, the power supply 60 includes a control IC 65 for controlling switching operation of the power factor improvement converter circuit 62, a capacitor circuit 66 formed e.g. by a capacitor, for supplying an operating current to the control IC 65, a start-up circuit 67 for controlling start-up of the control IC 65, a control IC 68 for controlling switching operation of the main switching circuit 64, a capacitor circuit 69 formed e.g. by a capacitor, for supplying operating current to the control IC 68, and a start-up circuit 70 for controlling start-up of the control IC 68. Moreover, the power supply 60 has a diode 81 arranged on the side of a secondary winding 63b of the transformer 63, for rectifying a voltage induced in the secondary winding 63b and a capacitor 82 also arranged on the secondary winding side, for smoothing the rectified pulsating current.

In the power supply 60, when the power is turned on, the capacitor circuit 66 is charged by a current caused to flow therein via a current path, not shown, by the pulsating voltage $V_D$. Subsequently, when a charging voltage of the capacitor circuit 66 has reached a predetermined voltage, the start-up circuit 67 starts up the control IC 65. This causes the control IC 65 to start controlling the switching operation of the power factor improvement converter circuit 62, whereby the converter circuit 62 boosts the pulsating voltage $V_D$ to thereby generate the DC voltage $V_{DC}$. On the other hand, the capacitor circuit 69 is also charged with a current caused to flow therein via a current path, not shown, by the DC voltage $V_{DC}$ and when the charging voltage of the capacitor circuit 69 has reached a predetermined voltage, the start-up circuit 70 starts up the control IC 68. This causes the control IC 68 to start controlling the switching operation of the main switching circuit 64, whereby the main switching circuit 64 switches the DC voltage $V_{DC}$ via a primary winding 63a of the transformer 63. As a result, a voltage is induced in the secondary winding 63b of the transformer 63. The induced voltage is rectified by the diode 81, and the rectified DC voltage is smoothed by the capacitor 82, whereby an output voltage $V_O$ is generated.

As described above, according to this power supply 60, first at the initial stage of power-on, the start-up circuit 67 starts up the control IC 65, and then the start-up circuit 70 starts up the main switching circuit 64, whereby the power factor improvement converter circuit 62 and the main switching circuit 64 are continuously operated for continuous generation of the output voltage $V_O$.

However, the power supply 60 suffers from the following problems: Firstly, in the power supply 60, the start-up circuit 67 for controlling start-up of the control IC 65 and the start-up circuit 70 for controlling start-up of the control IC 68 are arranged separately and independently of each other, which results in increased manufacturing costs and an increased size of the power supply 60 due to an increase in the number of component parts thereof. Secondly, since the start-up circuits 67 and 70 control the respective control ICs 65 and 68 separately and independently of each other, it is difficult to ensure a reliable start-up sequence of the two control ICs 65 and 68. As a result, the DC voltage $V_{DC}$ generated by the power factor improvement converter circuit 62 can be switched by the main switching circuit 64 before its voltage value is stable, which can cause a failure in start-up of the main switching circuit 64.

SUMMARY OF THE INVENTION

It is an object of the invention to provide an inexpensive and small-sized switching power supply which is capable of reliably and stably starting up dual converters thereof.

To attain the above object, the present invention provides a switching power supply including a first converter circuit for switching an input voltage for voltage conversion, a second converter circuit for switching a DC voltage generated by the first converter circuit, to thereby generate an output voltage, a first control circuit for controlling switching operation of the first converter circuit, a second control circuit for controlling switching operation of the second converter circuit, first energy-storing capacitor means for supplying an operating current to the first control circuit, second energy-storing capacitor means for supplying an operating current to the second control circuit, and at least one start-up circuit for controlling start-up of the two control circuits.

The switching power supply according to the invention is characterized by comprising an auxiliary power supply circuit for charging the first energy-storing capacitor means with a DC voltage generated by the second converter circuit, and in that the at least one start-up circuit is a single start-up circuit which comprises first charging means for charging the first energy-storing capacitor means with the input voltage, a unidirectional element via which energy stored in the first energy-storing capacitor means is supplied to the second energy-storing capacitor means when a charging voltage of the first energy-storing capacitor means is higher than a charging voltage of the second energy-storing capacitor means by a voltage equal to or higher than a predetermined voltage, and second charging means for charging the second energy-storing capacitor means with the DC voltage generated by the first converter circuit.

According to this power supply, when the power is turned on, the first charging means of the single start-up circuit charges the first energy-storing capacitor means with the input voltage. Then, when the charging voltage of the first energy-storing capacitor means is increased to a voltage which is higher than a charging voltage of the second energy-storing capacitor means by a predetermined voltage, the unidirectional element operates to allow the second energy-storing capacitor means to be charged by a current dependent on energy stored in the first energy-storing capacitor means. Thereafter, when the charging voltage of the first energy-storing capacitor means exceeds an operation-enabling voltage level of the first control circuit, the first control circuit is started by being supplied with an operating current from the first energy-storing capacitor means. As a result, the first control circuit controls the switching operation of the first converter circuit, whereby the voltage conversion by the first converter circuit is started to generate a DC voltage. Thereafter, the second charging means charges the second energy-storing capacitor means with the DC voltage generated by the first converter circuit. At this time, start-up of the first converter circuit can cause a decrease in the charging voltage of the first energy-storing capacitor means. In such a case, however, the unidirectional element prevents a current dependent on the energy stored in the second energy-storing capacitor means from flowing reversely to the first energy-storing capacity means. Therefore, the second energy-storing capacitor means is continuously charged by the second charging means, whereby the charging voltage of the second energy-storing capacitor means is progressively increased.

Then, when the charging voltage of the second energy-storing capacitor means exceeds an operation-enabling voltage level above which the second control circuit is made operative, the second control circuit is started by being supplied with the operating current from the second energy-storing capacitor means. As a result, the second control circuit controls the switching operation of the second converter circuit, whereby the second converter circuit switches the DC voltage generated by the first converter circuit, to thereby generate the output voltage. Thereafter, the auxiliary power supply circuit charges the first energy-storing capacitor means with the DC voltage generated by the switching operation of the second converter circuit. Accordingly, the first energy-storing capacitor means is charged rapidly, which enables the first control circuit to continue stably controlling the switching operation of the first converter circuit. Further, when the voltage of the first energy-storing capacitor means is increased by the predetermined voltage, the unidirectional element allows the second energy-storing capacitor means to be charged by the current dependent on the energy stored in the first energy-storing capacitor means. As a result, the second energy-storing capacitor means continuously supplies the operating current to the second control circuit, thereby enabling the second control circuit to continue stably controlling the switching operation of the second converter circuit.

According to this switching power supply, the auxiliary power supply circuit is provided for charging the first energy-storing capacitor means with the DC voltage generated by the switching operation of the second converter circuit, and the start-up circuit comprises the first charging means, the unidirectional element, and the second charging means. Therefore, it is possible to control the start-up of the two control circuits by the single start-up circuit, which allows circuitry of the switching power supply to be made simpler in configuration than that of the power supply 60. Therefore, the number of component parts of the switching power supply can be reduced, which contributes to reduction of the size and manufacturing costs of the same. Further, in this switching power supply, the second charging means charges the second energy-storing capacitor means, and after start-up of the second converter circuit, the auxiliary power supply circuit not only charges the first energy-storing capacitor means, but also charges the second energy-storing capacitor means via the unidirectional element, so that it is possible to reliably and stably start up the two control circuits without causing any start-up failure.

Preferably, the first charging means comprises a current-limiting resistor and a switching element, and the second charging means comprise current-limiting resistors also serving as resistors for biasing the switching element.

The first charging means can be formed by a diode, a current-limiting resistor, or the like. However, the use of a diode can cause power loss in charging the first energy-storing capacitor means. Further, since the auxiliary power supply circuit charges the first energy-storing capacitor means and the second energy-storing capacitor means after start-up of the two control circuits, charging of the first energy-storing capacitor means by the first charging means is unnecessary. In the switching power supply of the invention, the first charging means is formed e.g. by a switching element, such as an FET, a transistor, or the like, and a current-limiting resistor. Therefore, the power loss occurring when the first energy-storing capacitor means is being charged is reduced. Further, after start-up of the two control circuits, by stopping the switching operation of the switching element, it is possible to avoid the power loss occurring during charging of the first energy-storing capacitor means.

According to this switching power supply, since the first charging means comprises the current-limiting resistor and the switching element, and the second charging means comprises current-limiting resistors also serving as resistors for biasing the switching element, the latter current-limiting resistors serve not only as the resistors for biasing the switching element, but also as the current-limiting resistors for charging the second energy-storing capacitor means. This makes it possible to reduce the number of component parts used for the above purposes, thereby attaining reduction of the size and manufacturing costs of the switching power supply.

Preferably, the unidirectional element is formed by a Zener diode and a diode connected in series to the Zener diode such that anodes or cathodes of the Zener diode and the diode are opposed to each other.

The unidirectional element can be formed e.g. by a diode alone. In such a case, the predetermined voltage is determined based on the forward voltage VF of the diode. In this switching power supply, however, the unidirectional element is formed by a Zener diode and a diode. In this case, the diode has a function of preventing current from flowing reversely from the second energy-storing capacitor means to the first energy-storing capacitor means when the charging voltage of the first energy-storing capacitor means becomes lower than that of the second energy-storing capacitor means, while the Zener diode has a function of determining the predetermined voltage based on its Zener voltage and the forward voltage VF of the diode. Accordingly, by properly setting the Zener voltage of the Zener diode, it is possible to define the predetermined voltage to a desired voltage. Thus, in the case of determining timing for starting up the first and second control circuits, based on the charging voltages of the first and second energy-storing capacitor means, it is possible to define the start-up of the second control circuit to desired timing by properly setting the Zener voltage of the Zener diode.

BRIEF DESCRIPTION OF THE DRAWINGS

These and other objects and features of the present invention will be explained in more detail below with reference to the attached drawings, wherein.

DESCRIPTION OF THE PREFERRED EMBODIMENT

The invention will now be described in detail with reference to drawings showing a preferred embodiment thereof. In the embodiment, the switching power supply according to the invention is applied to a flyback power supply 1.

Figure 1:
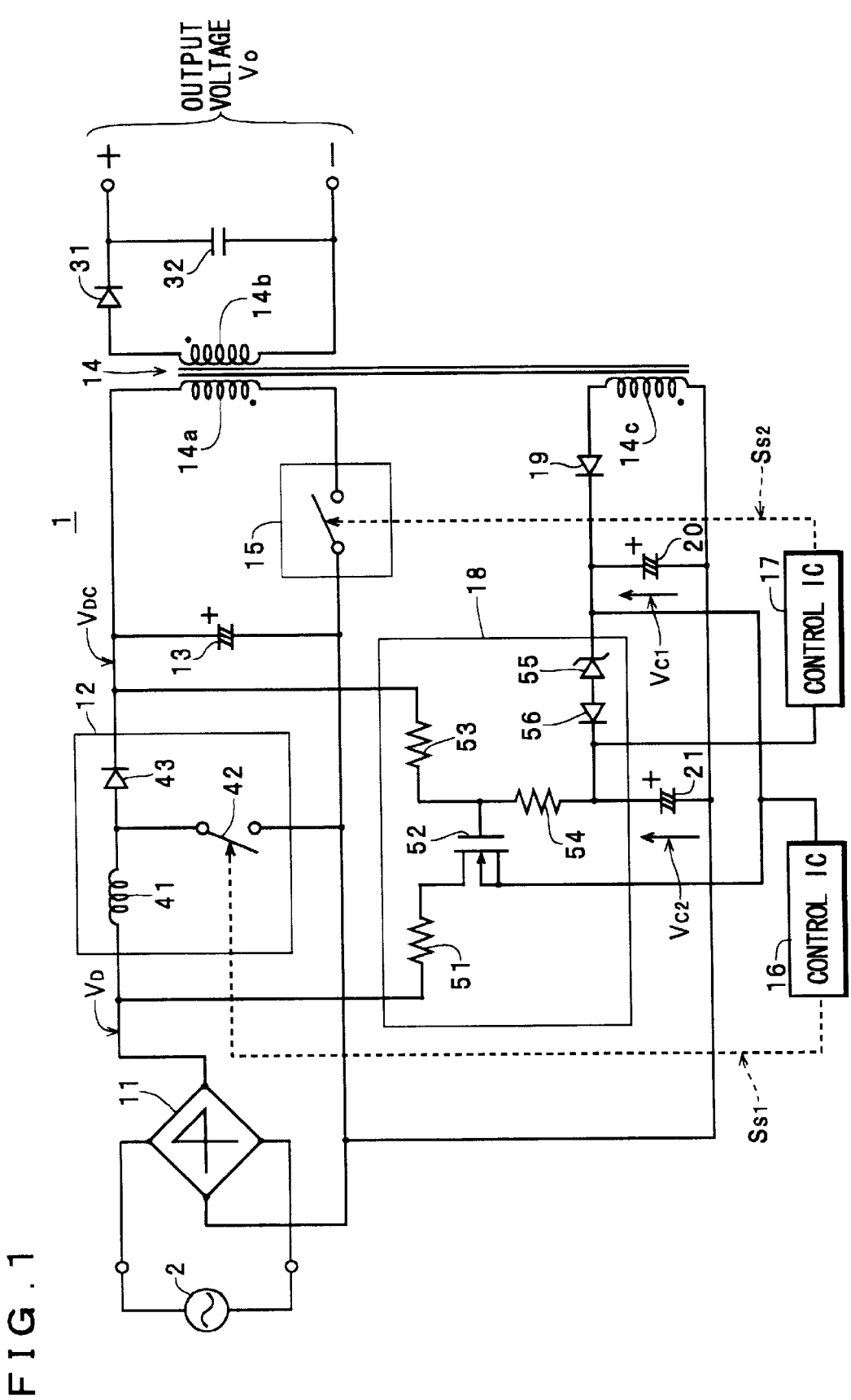
FIG. 1 is a circuit diagram showing the arrangement of a power supply 1 according to an embodiment of the invention.

Referring first to FIG. 1, there is shown the circuitry of the power supply 1. The power supply 1 is comprised of a diode stack 11 for full-wave rectification of an AC current output from an AC power source 2, a power factor improvement converter circuit 12 for boosting a pulsating voltage (voltage of a pulsating current) $V_D$ generated by the diode stack 11 and thereby generating a DC voltage $V_{DC}$, a smoothing capacitor 13, and a main switching circuit 15 for switching the DC voltage $V_{DC}$ via a primary winding 14a of a transformer 14. Further, the power supply 1 includes a control IC 16 for controlling switching operation of the power factor improvement converter circuit 12 corresponding to a first converter circuit according to the invention, a control IC 17 for controlling switching operation of the main switching circuit 15 corresponding to a second converter circuit according to the invention, a start-up circuit 18 for controlling start-up of the control ICs 16 and 17, a diode 19 forming an auxiliary power supply circuit of the invention together with an auxiliary winding 14c of the transformer 14, for rectifying a voltage induced in the auxiliary winding 14c, and capacitors 20 and 21 corresponding to respective first and second energy-storing capacitor means of the invention. Moreover, the power supply 1 has a rectifying diode 31 and a smoothing capacitor 32 each arranged on the side of a secondary winding 14b of the transformer 14.

In the embodiment, the power factor improvement converter circuit 12 corresponding to the first converter circuit of the invention is comprised of a boost choke coil 41, a switching element 42 formed e.g. by an FET, and a rectifying diode 43. Switching operation of the switching element 42 in the power factor improvement converter circuit 12 is controlled by the control IC 16. More specifically, the control IC 16 controls the frequency or duty ratio of a switching control signal $S_{S1}$ supplied to the switching element 42 to thereby control the switching operation of the switching element 42 such that the DC voltage $V_{DC}$ is stabilized at a predetermined voltage and at the same time, the waveform of the input current flowing in from the AC power source 2 becomes close to that of a sinusoidal wave. On the other hand, the main switching circuit 15 corresponding to the second converter circuit of the invention is formed e.g. by an FET. The main switching circuit 15 has its switching operation controlled by the control IC 17. More specifically, the control IC 17 controls the frequency or duty ratio of a switching control signal $S_{S2}$ to be output to the main switching circuit 15, such that the voltage value of an output voltage $V_O$ is stabilized at a predetermined voltage.

The start-up circuit 18 is comprised of a current-limiting resistor 51, an FET 52 corresponding to a switching element of the invention, resistors 53 and 54, which correspond to second charging means of the invention, for charging the capacitor 21 with the DC voltage $V_{DC}$ as well as serving as resistors for use in biasing the FET 52, and a Zener diode 55 and a diode 56 connected in series to the Zener diode 55 such that anodes (or cathodes) of the two diodes are opposed to each other. The Zener diode 55 and the diode 56 correspond to a unidirectional element of the invention. In this embodiment, the resistor 51 and the FET 52 forms first charging means of the invention. The Zener diode 55 is of a type having a Zener voltage of e.g. 2 V. When a charging voltage $V_{C1}$ of the capacitor 20 reaches a voltage which is higher than a charging voltage $V_{C2}$ of the capacitor 21 by a predetermined voltage (approximately 2.6 V in the embodiment, which includes a forward voltage $V_F$ of the diode 56), the Zener diode 55 charges the capacitor 21 by a current dependent on energy stored in the capacitor 20. It should be noted that by properly setting the Zener voltage of the Zener diode 55, it is possible to define desired start-up timing for starting up the control IC 17 after start-up of the control IC 16. On the other hand, the diode 56 prevents the current from flowing reversely from the capacitor 21 to the capacitor 20 when the charging voltage $V_{C1}$ of the capacitor 20 becomes lower than the charging voltage $V_{C2}$ of the capacitor 21.

Next, the operation of the power supply 1 will be described with reference to FIGS. 2A to 2D.

Figure 2A:
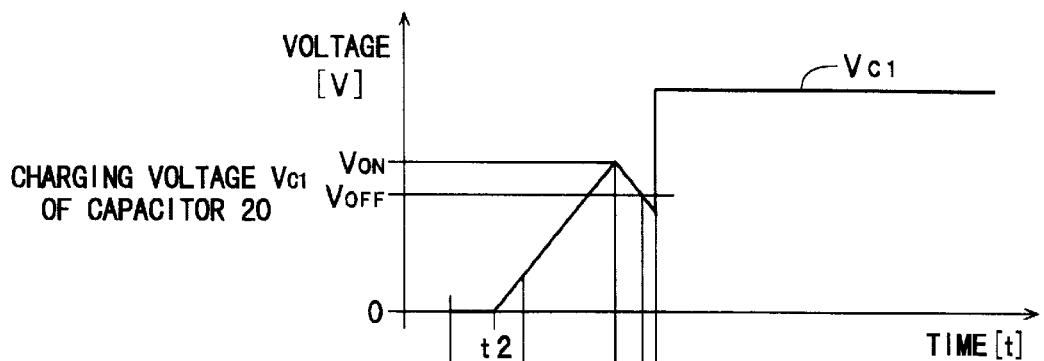
FIG. 2A is a diagram showing a waveform of a charging voltage $V_{C1}$ of a capacitor 20 of the power supply according to the embodiment.
Figure 2B:
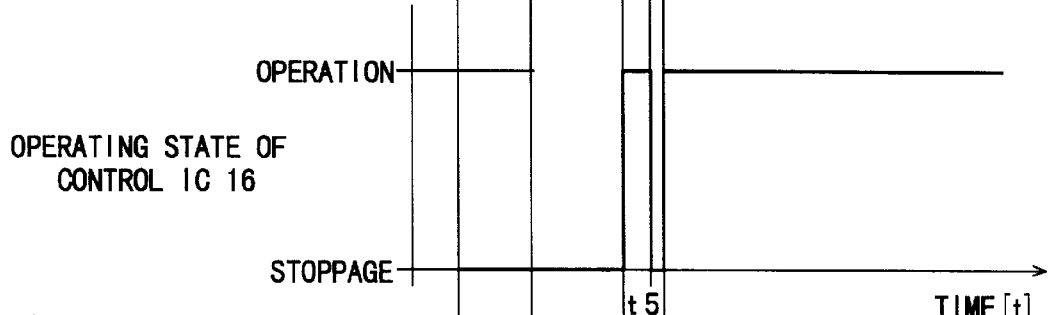
FIG. 2B is a diagram showing an operating state of a control IC 16 of the power supply according to the embodiment.
Figure 2C:
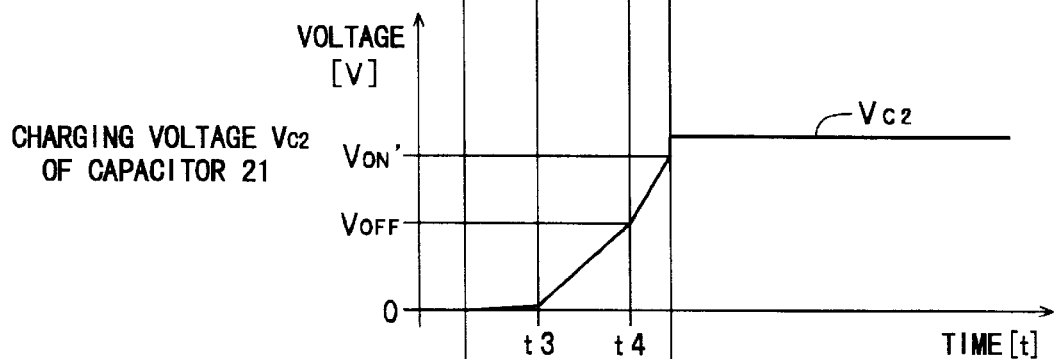
FIG. 2C is a diagram showing a waveform of a charging voltage $V_{C2}$ of a capacitor 21 of the power supply according to the embodiment.
Figure 2D:
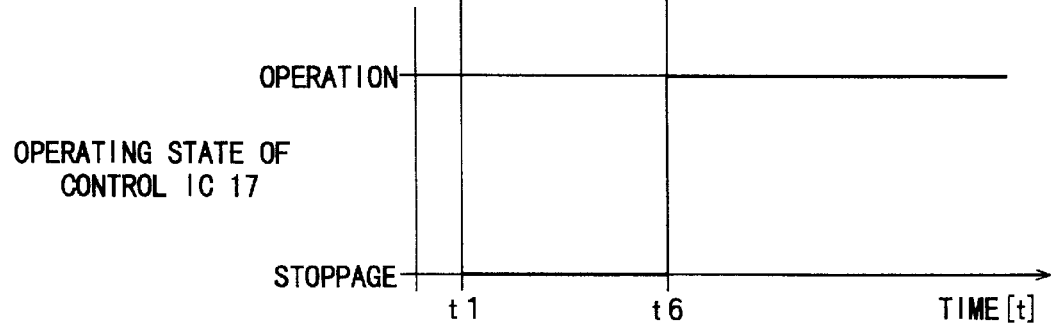
FIG. 2D is a diagram showing an operating state of a control IC 17 of the power supply according to the embodiment.
Figure 3:
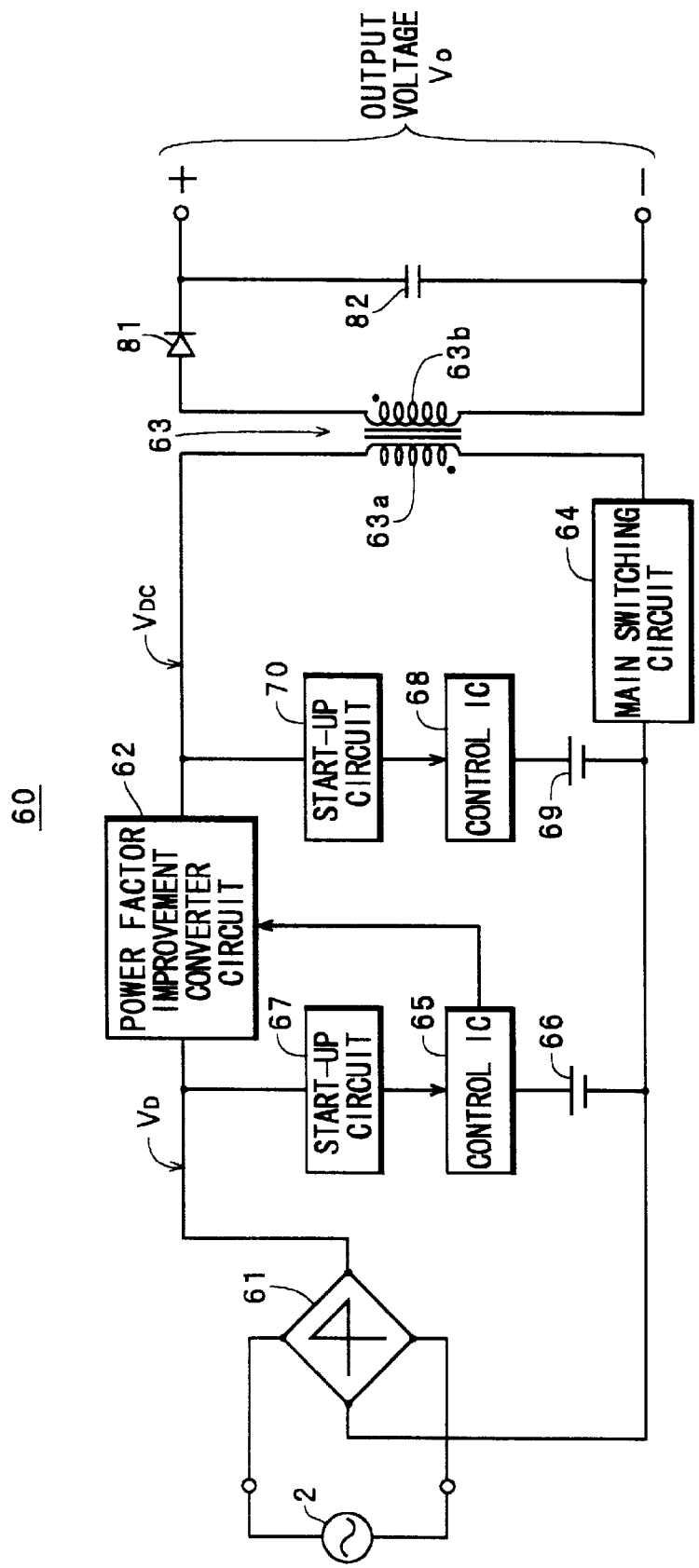
FIG. 3 is a circuit diagram showing the arrangement of a power supply 60 according to the related art.

At a time t1 when the power is turned on, the pulsating voltage $V_D$ is supplied to the capacitor 13 via the choke coil 41 and the diode 43 within the power factor improvement converter circuit 12. As a result, the capacitor 13 is progressively charged, whereby the DC voltage $V_{DC}$ between terminals of the capacitor 13 is progressively increased. At the same time, the DC voltage $V_{DC}$ is supplied to the capacitor 21 via the high-resistance resistors 53 and 54, whereby the capacitor 21 is slightly charged as shown in FIG. 2C. Further, from this time on, a voltage obtained by dividing the DC voltage $V_{DC}$ by a voltage division ratio defined by a ratio between resistances of the resistors 53 and 54 is applied to the gate of the FET 52. Then, at a time t2 when the capacitor 13 is charged to a certain voltage level, the FET 52 is operated, whereby the pulsating voltage $V_D$ is supplied to the capacitor 20 via the resistor 51 and the FET 52. As a result, the capacitor 20 is charged as shown in FIG. 2A, whereby its charging voltage $V_{C1}$ is progressively increased.

Subsequently, at a time t3 when the charging voltage $V_{C1}$ of the capacitor 20 exceeds the Zener voltage of the Zener diode 55, the Zener diode 55 enters its ON state. This causes the capacitor 21 to start to be charged by the current dependent on the energy stored in the capacitor 20, whereby the charging voltage $V_{C2}$ of the capacitor 21 is progressively increased as shown in FIG. 2C. Then, at a time t4 when the charging voltage $V_{C1}$ exceeds an operation-enabling voltage level $V_{ON}$ above which the control IC 16 is made operative, the control IC 16 starts its operation as shown in FIG. 2B. In this case, since the charging voltage $V_{C2}$ of the capacitor 21 has not reached an operation-enabling voltage level $V_{ON}'$ above which the control IC 17 is made operative, the control IC 17 is held in an inoperative state.

When the control IC 16 starts its operation, the switching operation of the switching element 42 in the power factor improvement converter circuit 12 is controlled by the control IC 16, whereby the pulsating voltage $V_D$ is boosted into the DC voltage $V_{DC}$, and the capacitor 13 is charged with the DC voltage $V_{DC}$. At the same time, since the DC voltage $V_{DC}$ is supplied to the capacitor 21 via the resistors 53 and 54, the charging voltage $V_{C2}$ of the capacitor 21 is further increased as shown in FIG. 2C. On the other hand, the energy stored in the capacitor 20 is consumed by the control IC 16, and when a current discharged for the consumption by the control IC 16 is larger than a current flowing into the capacitor 20 to charge the same, the charging voltage $V_{C1}$ of the capacitor 20 continues to be lowered progressively until a time t5 when it becomes lower than an operation-disabling voltage level $V_{OFF}$ below which the control IC 16 is made operative. This causes the control IC 16 to stop its operation as shown in FIG. 2B.

In the meantime, since the flow of current into the capacitor 20 based on the energy stored in the capacitor 21 is inhibited by the diode 56, the charging voltage $V_{C2}$ of the capacitor 21 continues to be further increased until a time t6 when it reaches the operation-enabling voltage level $V_{ON}'$ for making the control IC 17 operative. At this time, the control IC 17 starts control of the switching operation of the main switching circuit 15. This causes a current dependent on the DC voltage $V_{DC}$ to flow through the primary winding 14a of the transformer 14, whereby a voltage is induced in the secondary winding 14b. The induced voltage is rectified by the diode 31, and then the rectified pulsating voltage is smoothed by the capacitor 32, for generation of the output voltage $V_O$.

At the same time, a voltage is induced in the auxiliary winding 14c as well. This induced voltage is rectified by the diode 19 to charge the capacitor 20. As a result, as shown in FIG. 2A, the charging voltage $V_{C1}$ of the capacitor 20 rises sharply at the time point t6, whereby the control IC 16 is made operative again instantaneously as shown in FIG. 2B. Further, at this time, with the sharp increase in the charging voltage $V_{C1}$, a current dependent on the charging voltage $V_{C1}$ flows into the capacitor 21 to charge the same rapidly. As a result, the charging voltage $V_{C2}$ of the capacitor 21 rises sharply at the time t6, as shown in FIG. 2C. From then on, the two control ICs 16 and 17 each continue to stably operate without being caused to stop.

As described above, according to the power supply 1, since the start-up of the two control ICs 16 and 17 is controlled by the single start-up circuit 18, the circuitry of the power supply 1 can be simplified compared with that of the conventional power supply 60, which makes it possible to reduce the number of component parts of the power supply 1, thereby attaining reduction of the size and manufacturing costs of the power supply. Further, even when the control IC 16 stops its operation due to a decrease in the charging voltage $V_{C1}$ of the capacitor 20, the capacitor 21 is charged with the DC voltage $V_{DC}$ applied thereto via the resistors 53 and 54, whereby start-up of the control IC 17 is ensured. Further, once the main switching circuit 15 has been started up, the capacitor 20 is charged rapidly with the voltage induced in the auxiliary winding 14c, which enables the two control ICs 16 and 17 to continue to operate reliably and stably without any start-up failure. Moreover, since the resistors 53 and 54 serve not only as resistors for biasing the FET 52, but also as current-limiting resistors for feeding the capacitor 21, it is possible to decrease the number of components used for these purposes, thereby attaining reduction of the size and manufacturing costs of the power supply.

It should be noted that the present invention is not limited to the above embodiment, but the construction thereof can be modified as required. For example, although in the above embodiment, the power supply 1 is of a flyback type, this is not limitative, but the invention is applicable to a forward-type switching power supply. Further, a voltage-monitoring circuit may be provided for monitoring the output voltage from the diode 19 serving as an auxiliary power supply circuit, so as to stop switching operation of the FET 52 (corresponding to the switching element of the invention) when the voltage-monitoring circuit determines that the output voltage has reached a predetermined voltage. This construction makes it possible to eliminate power loss of the resistor 51 which occurs in charging the capacitor 20, so that the conversion efficiency of the power supply 1 can be enhanced. Further, the Zener voltage of the Zener diode 55 can be changed, as required, according to the operation-enabling voltage level VON of the control IC 16. Still further, it is possible to employ the diode 56 alone in stead of using both the Zener diode 55 and the diode 56. In this case, the "predetermined voltage" of the invention corresponds to the forward voltage VF of the diode 56. Alternatively, a plurality of diodes may be connected in series to each other. Moreover, a capacitor having a measure of large capacitance may be used as the capacitor 20 so as to prevent the charging voltage of the capacitor 20 from being lowered due to start-up of the control IC 16. The use of such a capacitor makes it possible to avoid a momentary inoperative state of the control IC.

Further, the arrangement of the first and second control circuits as well as that of the first and second converter circuits, according to the invention, are not limited to those of the corresponding circuits of the embodiment, but it is possible to adopt other arrangement as required. Similarly, the switching element is not limitative to the FET employed in the embodiment, but a transistor or the like can be used instead. Moreover, it is also possible to modify the auxiliary power supply circuit as required e.g. by using a voltage stabilizing circuit.

What is claimed is:

1. A switching power supply including a first converter circuit for switching an input voltage for voltage conversion, a second converter circuit for switching a DC voltage generated by said first converter circuit, to thereby generate an output voltage, a first control circuit for controlling switching operation of said first converter circuit, a second control circuit for controlling switching operation of said second converter circuit, first energy-storing capacitor means for supplying an operating current to said first control circuit, second energy-storing capacitor means for supplying an operating current to said second control circuit, and at least one start-up circuit for controlling start-up of said two control circuits, the switching power supply comprising an auxiliary power supply circuit for charging said first energy-storing capacitor means with a DC voltage generated by said second converter circuit, wherein said at least one start-up circuit is a single start-up circuit which comprises first charging means for charging said first energy-storing capacitor means with said input voltage, a unidirectional element via which energy stored in said first energy-storing capacitor means is supplied to said second energy-storing capacitor means when a charging voltage of said first energy-storing capacitor means is higher than a charging voltage of said second energy-storing capacitor means by a voltage equal to or higher than a predetermined voltage, and second charging means for charging said second energy-storing capacitor means with said DC voltage generated by said first converter circuit.

2. A switching power supply according to claim 1, wherein said first charging means comprises a current-limiting resistor and a switching element, and wherein said second charging means comprise current-limiting resistors also serving as resistors for biasing said switching element.

3. A switching power supply according to claim 2, wherein said unidirectional element is formed by a Zener diode and a diode connected in series to said Zener diode in a manner such that anodes or cathodes of said Zener diode and said diode are opposed to each other.

4. A switching power supply according to claim 1, wherein said unidirectional element is formed by a Zener diode and a diode connected in series to said Zener diode such that anodes or cathodes of said Zener diode and said diode are opposed to each other.

* * * * *